Inventors:
James Vani
Albert J. Malpede

May 28, 1963 J. VANI ETAL 3,090,981
AUTOMOTIVE VEHICLE WASHING UNIT
Filed Dec. 15, 1961 4 Sheets-Sheet 3

Inventors
James Vani
Albert J. Malpede

Inventors:
James Vani
Albert J. Malpede

United States Patent Office 3,090,981
Patented May 28, 1963

3,090,981
AUTOMOTIVE VEHICLE WASHING UNIT
James Vani, Chicago, and Albert J. Malpede, Midlothian, Ill., assignors to Service Metal Fabricators, Inc., Chicago, Ill., a corporation of Illinois
Filed Dec. 15, 1961, Ser. No. 159,542
12 Claims. (Cl. 15—21)

This invention relates to washing devices and, more particularly, to washing devices which are particularly well adapted for washing automotive vehicles and the like.

It is a primary object of the present invention to afford a novel washing apparatus for washing automotive vehicles and the like.

Another object of the present invention is to enable a novel washing apparatus to be afforded which is of the type wherein a vehicle may be washed during movement thereof past the apparatus.

Washing apparatus for automotive vehicles, and the like, wherein the vehicles are washed thereby during movement of the vehicles past or through the apparatus, have been heretofore known in the art. However, such devices as have been heretofore known in the art have commonly had several disadvantages, such as, for example, being ineffective to efficiently wash the side portions of such a vehicle, and particularly the lower edge portions of the body portion thereof, commonly referred to in the trade as the "rocker panels," especially when the latter are curved or slanted inwardly under the remainder of the body portion. It is an important object of the present invention to overcome such disadvantages.

Another object of the present invention is to afford a novel washing apparatus for effectively and efficiently washing the side portions of an automotive vehicle, and the like, including the rocker panels thereof.

Another object is to enable such washing of the side portions of a vehicle to be automatically accomplished in a novel and expeditious manner.

A further object of the present invention is to afford a novel washing apparatus of the aforementioned type which may be constructed and operated as a separate unit, or which may be constructed and operated as an integral part of a washing apparatus operable to also wash other portions of such a vehicle.

Another object is to afford a novel washing apparatus of the aforementioned type which is practical and efficient in operation and may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Figure 1:
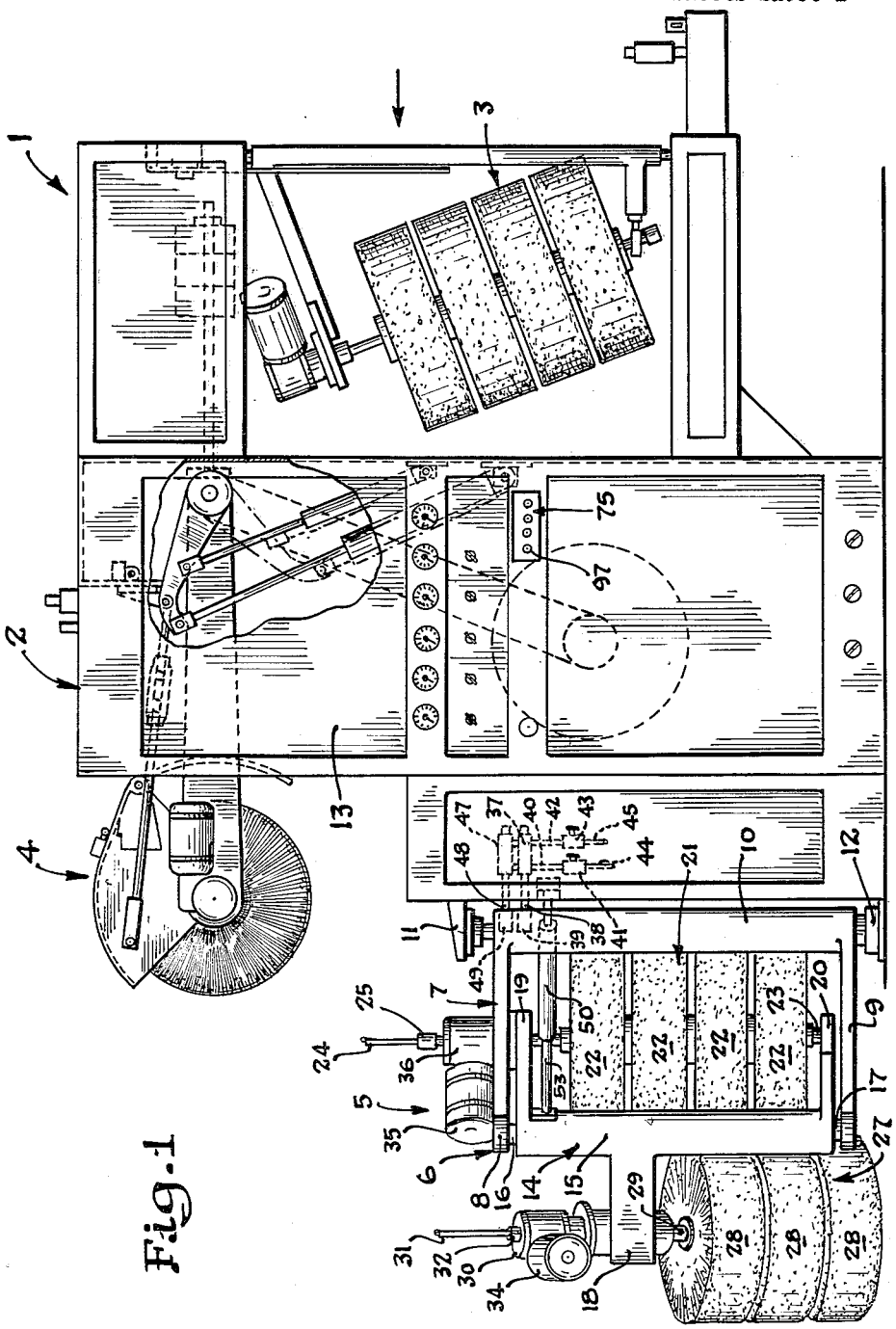
FIG. 1 is a side elevational view of a vehicle washing apparatus embodying the principles of the present invention.

A vehicle washing apparatus 1, embodying the principles of the present invention is shown in the drawings to illustrate the preferred embodiment of the present invention.

Figure 2:
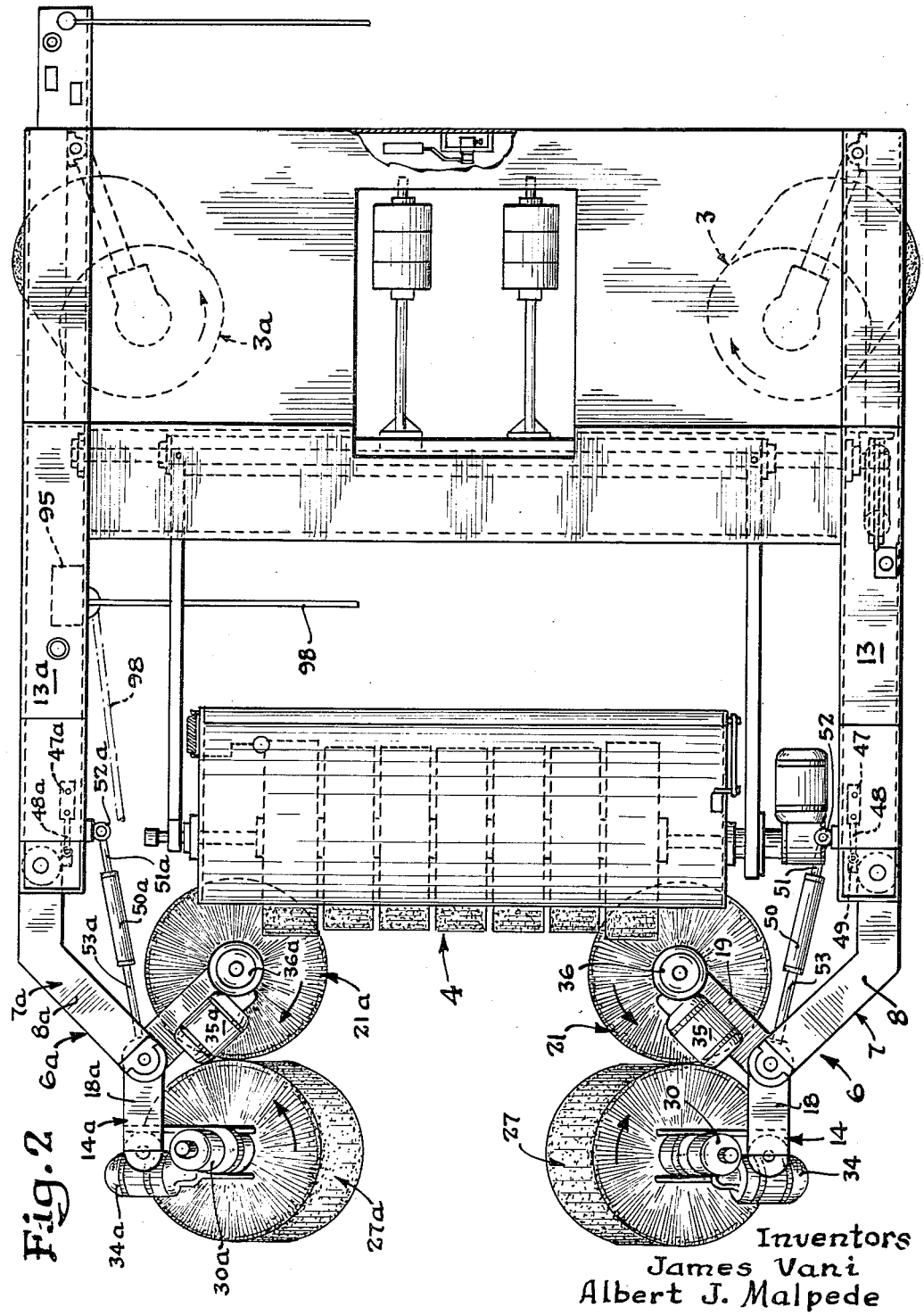
FIG. 2 is a top plan view of the apparatus shown in FIG. 1.

The washing apparatus 1 includes a supporting member 2 in the form of a substantially arch-shaped housing, through the center of which a vehicle to be washed passes from right to left as viewed in FIGS. 1 and 2. The apparatus 1 embodies, in general, apparatus 3 for washing the side windows and upper portion of the sides of a vehicle; apparatus 4 for washing the top of a vehicle; and apparatus 5 for washing the sides of a vehicle, FIGS. 1 and 2. The present invention is particularly concerned with the side-washing apparatus 5. The window-washing apparatus 3 and the top-washing apparatus 4 are of a type which have been heretofore known in the art and form no part of the present invention except as insofar as they may form a part of the entire combination.

The side-washing apparatus 5 includes a brush unit 6, including a substantially U-shaped mounting bracket 7 having two substantially parallel arms 8 and 9 projecting from respective opposite ends of a central body portion 10, FIG. 1. The central body portion 10 of the bracket 7 is rotatably mounted between and supported by supporting members 11 and 12 projecting horizontally from one side 13 of the arch-shaped housing 2. The supporting members 11 and 12 project forwardly from the housing 2 and are disposed in position to support the central body portion 10 of the bracket 7 in substantially upright position.

Another mounting bracket 14 is rotatably supported by the mounting bracket 7. The mounting bracket 14 includes an elongated, substantially straight body portion 15 disposed between the free end portions of the arms 8 and 9 of the mounting bracket 7, and rotatably secured thereto by suitable bearing members 16 and 17, respectively. A single arm 18 projects forwardly from the longitudinal central portion of the body portion 15 in substantially perpendicular relation thereto. Two other arms 19 and 20 project from the upper and lower end portions of the body portion 15, respectively, in substantially parallel relation to each other, FIG. 1. The arms 19 and 20 project rearwardly from the central body portion 15 of the bracket 14 and are so disposed relative to the arm 18 that the vertical plane in which the longitudinal center lines of the arms 19 and 20 are disposed, and the vertical plane in which the longitudinal center line of the arm 18 is disposed are disposed at an obtuse angle to each other, with the angle opening generally inwardly toward the path of movement of a vehicle through the side-washing apparatus 5, FIG. 2.

A brush 21, which includes a plurality of substantially cylindrical-shaped bristle sections 22 mounted on and secured to a centrally disposed drive shaft 23 for rotation with the latter, is rotatably mounted in the free end portions of the arms 19 and 20 of the mounting bracket 14, with the lower end portion of the drive shaft 23 resting in and supported by the free end portion of the arm 20, and the upper end portion of the drive shaft 23 extending upwardly through the free end portion of the arm 19. The brush 21 is of a type commonly used in vehicle washing apparatus, and the like, and the drive shaft 23 is hollow and has a plurality of openings, not shown, extending through side wall portions thereof within the bristle sections 22 for feeding liquid outwardly into the bristle sections 22. One end of a suitable flexible conduit, such as, for example, a rubber hose 24, is connected to the upper end portion of the drive shaft 23 by a rotary coupling 25, FIG. 1. The other end of the conduit 24 is connected through a suitable valve, such as a solenoid-operated valve 26, FIG. 5, to a suitable source of washing liquid, not shown.

Another brush 27, which is similar in construction to the brush 21 is rotatably mounted on the arm 18. The brush 27, like the brush 21, includes a plurality of bristle sections 28 secured to a hollow drive shaft 29, which extends through the radial center of the substantially cylindrical-shaped bristle sections 28. The drive shaft 29 extends upwardly through a reduction gear unit 30, mounted on the free end portion of the arm 18 of the mounting bracket 14, FIGS. 1, 2, and 3. Like the drive shaft 23 of the brush 21, the drive shaft 29 is hollow, being closed at its lower end, and having openings, not shown, extending radially through the side walls thereof within the bristle sections 28. One end of a suitable flexible conduit, such as, for example, a rubber hose 31 is operatively attached to the upper end of the drive shaft 29 by a rotary coupling 32, FIG. 1. The other end of the conduit 31 is connected through a suitable valve, such as a solenoid-operated valve 33, FIG. 5, to a suitable source of liquid, not shown, whereby, when the valve 33 is open, liquid may be fed through the conduit 31 and the rotary coupling 32 into the drive shaft 29, from whence it may be fed outwardly into the bristle sections 28 to wet the latter.

An electric motor 34, FIGS. 1, 2, 3, and 5, is secured to the reduction gear unit 30 and is operatively connected thereby to the drive shaft 29 for rotating the drive shaft 29 and, therefore, the bristle sections 28. Similarly, an electric motor 35 is operatively connected through a reduction gear unit 36 to the upper end portion of the drive shaft 23 for rotating the drive shaft 23 and, therefore, the bristle sections 22 mounted thereon.

An air cylinder 37, having a piston 38 is mounted on the housing 2, with the free end of the piston 38 secured to an ear 39 projecting radially outwardly from the upper end portion of the body portion 10 of the rotatably mounted mounting bracket 7, FIG. 1. One end of a suitable conduit, such as an air hose 40, is operatively connected to the end of the air cylinder 37 adjacent to the free end of the piston 38, and the other end of the conduit 40 is operatively connected to one side of a flow-control valve 41, FIG. 1. Similarly, one end of a suitable conduit 42 is connected to the other end portion of the air cylinder 37, and the other end of the conduit 42 is connected to a flow-control valve 43. The other sides of the air control valves 41 and 43 are connected through suitable conduits 44 and 45, respectively, and a suitable control valve, such as, a solenoid-operated air valve 46, FIG. 5, to a suitable source of pneumatic pressure such as, for example, an air compressor, not shown.

It will be seen that with the air cylinder 37 constituted and arranged in the aforementioned manner, when air is fed through the conduits 44 and 40 into the left end of the air cylinder 37, as viewed in FIG. 1, the piston 38 is caused to move to the right to thereby swing the mounting bracket 39 and, therefore, the brushes 21 and 27 around the brackets 11 and 12 in a clockwise direction, as viewed in FIG. 2, to thereby swing the brushes 21 and 27 inwardly toward the path of movement of the vehicle through the side-washing apparatus 5. Also, when air is fed through the conduits 45 and 42 into the right end of the air cylinder 37, as viewed in FIG. 1, the piston 38 is moved to the left, as viewed in FIG. 1, to thereby swing the mounting bracket 7 and the brushes 21 and 27 in a counterclockwise direction, as viewed in FIG. 2, to thereby move the brushes 21 and 27 outwardly away from the longitudinal center of the path of travel of a vehicle through the side-washing apparatus 5. It will be understood, of course, by those skilled in the art that when the conduits 44 and 40 are feeding air under pressure into the cylinder 37, the conduits 45 and 42 are open through the valve 46 to the atmosphere, and vice versa.

The rate of flow of air through the conduits 44 and 40 and the conduits 45 and 42 may be controlled by properly adjusting the flow-control valves 45 and 42 to thereby adjust the speed of movement of the piston 38 into and out of the cylinder 37, and thereby adjust the speed of movement of the brushes 21 and 27 toward and away from the path of movement of a vehicle through the washing device 1.

A hydraulic cylinder 47 in the form of a dashpot, having a piston 48 projecting from one end is mounted on and secured to the housing 2, with the free end of the piston 48 secured to an ear 49 projecting radially outwardly from the body portion 10 of the mounting bracket 7 above and in parallel relation to the ear 39, FIGS. 1 and 2. The dashpot 47 tends to retard the movement of the mounting bracket 7 in the bracket members 11 and 12, to thereby tend to cause the swinging movement of the mounting bracket 7 and the brushes 21 and 27 toward and away from the path of travel of a vehicle through the washing device 1 to occur at a substantially constant velocity. It will be appreciated by those skilled in the art that although the cylinder 47 is shown herein as being in the form of a dashpot, other forms of retarding devices such as, for example, hydraulic cylinders connected through external hydraulic conduits to a suitable source of hydraulic fluid such as, for example, a reservoir, may be used without departing from the purview of the present invention.

Another hydraulic cylinder 50, in the form of a dashpot, is mounted on the housing 2 of the washing device 1 by means of a connecting member 51 having one end fixedly secured to one end of the hydraulic cylinder 50, and the other end pivotally secured to a suitable mounting bracket 52 on the housing, FIGS. 1 and 2. A piston 53 projects outwardly from the other end of the cylinder 50, and the free end thereof is rigidly secured to the upper end portion of the body member 15 of the mounting bracket 14 by suitable means such as, for example, welding. The dashpot 50 tends to assist the dashpot 47 in maintaining a uniform rate of travel of the mounting bracket 7 and the brushes 21 and 27 inwardly and outwardly relative to the path of travel of a vehicle through the washing device 1. In addition, it will be seen that the dashpot 50 retards the swinging movement of the mounting bracket 14 relative to the mounting bracket 7 and, therefore, yieldably tends to prevent rotation of the mounting bracket 14 and the brushes 21 and 27 relative to the mounting bracket 7 by pressure on the brushes 21 and 27, such as, for example, when the brushes 21 and 27 are engaged by the sides of an automobile passing through the washing device 1.

Figure 3:
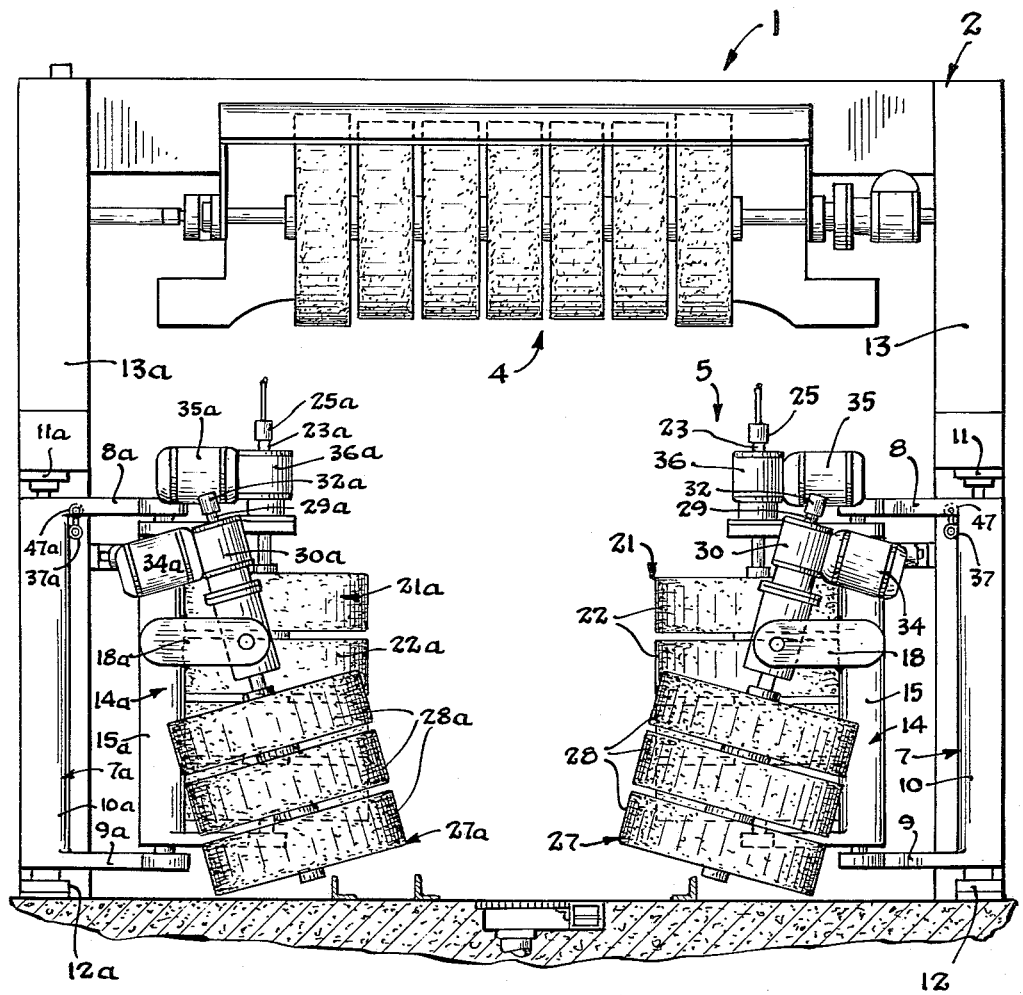
FIG. 3 is a front elevational view of the apparatus shown in FIG. 1, looking from the left as viewed from FIG. 1.

The right side of the side-washing device 5, as viewed in FIG. 3, has been hereinbefore described in substantial detail. The left side, of the side-washing device 5, as viewed in FIG. 3, is substantially identical to the right side, except that it is a mirror image thereof. The aforementioned left side of the side-wall washing unit 5 operates in the same manner as the right side thereof and, therefore, it is believed unnecessary to describe either the construction or the operation thereof in any substantial detail. The parts of the aforementioned left side of the side-wall washing unit 5 are designated in the drawings hereof by the same reference numerals as the corresponding parts of the aforementioned right side thereof, but with the suffix "a" added thereto.

The control mechanism for the side-wall washing unit 5, such as, for example, the solenoid-control valves 26, 26a, 33, 33a, and 46 and the aforementioned sources of supply of air and hydraulic fluid may be mounted in any suitable position in the washing device 1, such as, for example, in the side portions 13 or 13a of the housing 2.

Figure 5:
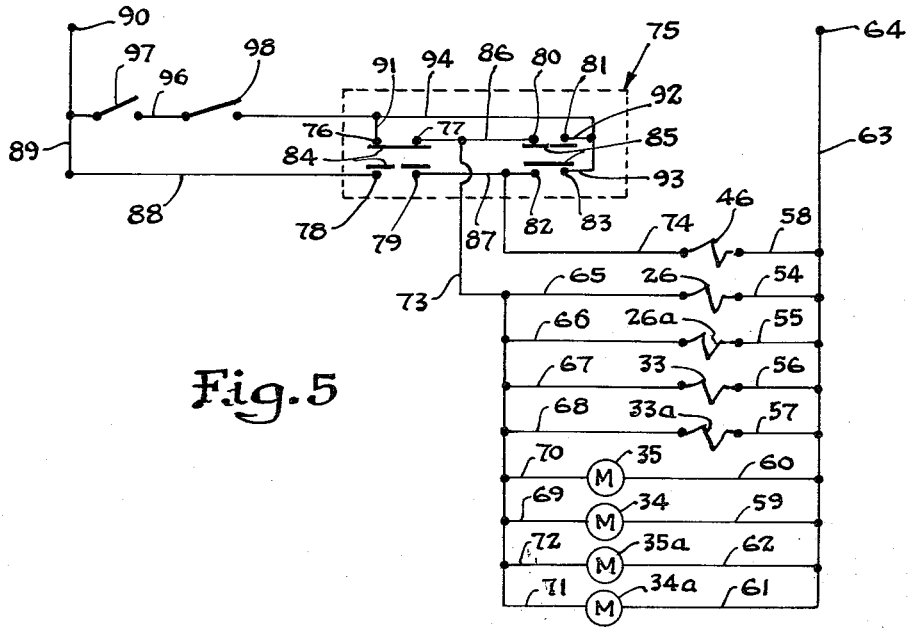
FIG. 5 is a wiring diagram for a portion of the apparatus shown in FIGS. 1–3, inclusive.

One side of the windings of each of the solenoid-actuated valves 26, 26a, 33, 33a, and 46, and one side of the motors 34, 34a, 35 and 35a may be connected through suitable electrical conductors, such as, wires 54—62, respectively, to an electrical conductor 63, such as a wire adapted to be connected to one side 64 of a suitable source of electric power, not shown, such as, for example, one side of the usual electrical outlet to be found in a shop or garage, FIG. 5. The other sides of the windings of the solenoid-actuated valves 26, 26a, 33, 33a, and of the motors 34, 34a, 35 and 35a are connected by suitable electrical conductors such as wires 65—72, respectively, to an electrical conductor 73, FIG. 5. The other side of the winding of the solenoid-actuated valve 46 is connected to an electrical conductor 74, FIG. 5. The other ends of the conductors 73 and 74 are connected to a double-pole double-throw switch 75, FIG. 5, which may be mounted in suitable position on the housing 2 of the washing device 1, such as, for example, on the portion 13 thereof FIG. 1.

The switch 75 includes four pairs of stationary contacts 76 and 77, 78 and 79, 80 and 81, and 82 and 83, FIG. 5. The switch 75 also includes two movable contacts or switch blades 84 and 85 movable between alternate engagement with the pairs of contacts 76—77 and 78—79, and 80—81 and 82—83, respectively.

The conductor 73 is electrically connected to an electrical conductor 86, the opposite ends of which are connected to the stationary contacts 77 and 80, respectively. The conductor 74 is connected to an electrical conductor 87, the opposite ends of which are connected to the stationary contacts 79 and 82, respectively. The stationary contact 78 is connected by an electrical conductor 88 to a conductor 89 connected to the other side 90 of the aforementioned suitable source of electric power. The stationary contacts 76, 81, and 83 are connected by conductors 91, 92, and 93, respectively, to a conductor 94, which is connected to one side of a switch 95. The other side of the switch 95 is connected through a conductor 96 and a switch 97 to the conductor 89.

The switch 95 embodies an actuating arm 98, FIG. 2, and is disposed in such position on the housing 2 of the washing device 1, that as a vehicle being washed in the washing device 1 approaches the side-washing apparatus 5, the vehicle engages the actuating member 98 and moves it from its normal, at-rest position, shown in solid lines in FIG. 2, wherein the switch 95 is open, to its actuated position, shown in broken lines in FIG. 2, wherein the switch 95 is closed. The actuating member 98 may be of any suitable construction, such as, for example, constructed from a wooden or metal core having a protective covering thereon made of suitable material, such as, for example rubber so as not to mar or scratch a vehicle engaging it.

The switch 97 may be of any suitable type, such as, for example, a manually operated switch, and may be mounted in any suitable position such as, for example, on the housing 2 adjacent to the switch 75, FIG. 1. The switch 97 may be a switch for controlling only the operation of the side-washing unit 5, or, if desired, it may be the master switch for controlling the operation of the entire washing device 1.

In the operation of the side-washing unit 5, the operator may adjust the selector switch 75 to set the movable contacts 84 and 85 thereof into the positions shown in solid lines in FIG. 5, to afford fully automatic operation of the side-washing unit 5. In this positioning of the contacts 84 and 85, the contact 84 is disposed in engagement with the contacts 76 and 77, and the contact 85 is in engagement with the contacts 82 and 83. With the contacts 84 and 85 in this position, and with the switch 97 closed, it will be seen that none of the solenoid-actuated valves 26, 26a, 33, 33a, and 46, and none of the motors 34, 34a, 35, and 35a are energized. However, when an automobile passing through the washing device 1 trips the switch 95 to thereby close the latter, this automatically energizes the solenoid-actuated valves 26, 26a, 33, 33a and 46, and the motors 34, 34a, 35, and 35a. The circuit for so energizing the solenoid-actuated valve 46 extends from the one side 90 of the power source through the conductor 89, the switch 97, the conductor 96, the switch 95, the conductors 94 and 93, the contacts 83, 85, and 82 of the switch 75, the conductors 87 and 74, the winding of the solenoid-actuated valve 46, and the conductors 58 and 63, to the other side 64 of the power source.

The circuit through the solenoid-actuated valves 26, 26a, 33, and 33a, and through the motors 34, 34a, 35, and 35a extends from the side 90 of the power source through the switch 97, the conductor 96, the switch 95, the conductors 94 and 91, the contacts 76, 84, and 77, the conductors 86 and 73, and then through the conductors 65—72, respectively, the valves 26, 26a, 33 and 33a and the motors 34, 34a, 35, and 35a, respectively, and through the conductors 58—62, respectively, and then through the conductor 63 to the other side 64 of the power source.

Thus, it will be seen that when an automobile passing through the washing device 1 engages the actuating member 98 of the switch 95 and thereby causes the switch 95 to close, when the master switch 97 is closed, and the selector switch 75 is set in the aforementioned "automatic" position, the air valve 46 is energized to cause the pistons 38 and 38a to be retracted into the cylinders 37 and 37a to thereby swing the mounting brackets 7 and 7a and the brushes 21 and 27, and 21a and 27a inwardly toward the longitudinal center of the path of movement of the car. Simultaneously with the energization of the air cylinders 38 and 38a, the motors 34, 35, 34a, and 35a are energized to thereby rotate brushes 27, 21, 27a, and 21a (respectively; the solenoid-actuated valves 26 and 26a are opened to thereby feed liquid into the brushes 21 and 21a; and the solenoid-actuated valves 33 and 33a are energized to feed liquid to the brushes 27 and 27a, respectively. Thus, as long as the vehicle remains operatively engaged with the actuating member 98, the brushes 21, 27, 21a and 27a are yieldingly held in position to yieldingly engage the respective side wall portions of the vehicle passing through the washing device 1, and are rotated by their respective motors 35, 34, 35a, and 34a, while liquid is fed outwardly through the drive shafts 23, 29, 23a, and 29a to wet the bristle sections 22, 28, 22a, and 28a, respectively, to thereby effectively wash the side portions of the automobile engaged by the brushes 21, 27, 21a, and 27a. The washing liquid fed into the brushes 21, 27, 21a, and 27a may be of any suitable type such as, for example, water having a suitable detergent therein.

As may be seen in FIG. 3, the brushes 21 and 21a are so disposed on the mounting brackets 14 and 14a, respectively, that the longitudinal centers of the drive shafts 23 and 23a thereof are disposed in substantially upright vertical position. As may also be seen in FIG. 3, the brushes 27 and 27a extend below the brushes 21 and 21a, and are so disposed on the mounting brackets 14 and 14a that the longitudinal centers of the drive shafts 29 and 29a thereof project upwardly and outwardly away from the path of travel of a vehicle passing through the washing device 1 at an acute angle to the vertical. The brushes 21 and 21a are preferably of such length that they extend from a position above the lower edge portion of the windows of a vehicle passing through the washing unit 1, to a position adjacent to but spaced upwardly from the horizontal plane of the lower edge of the body portion of such a vehicle. The brushes 27 and 27a are preferably somewhat shorter than the brushes 21 and 21a, with the upper edge portions thereof terminating below the upper edge portions of the brushes 21 and 21a. The lower edge portions of the brushes 27 and 27a terminate below the lower edge portions of the brushes 21 and 21a, and the brushes 27 and 27a are disposed in such a position as to effectively engage the outer periphery of the bristle sections 28 and 28a with the lower edge portions of the body portion of the vehicle passing through the washing device 1. The lower edge portions of such vehicles, which are commonly referred to in the trade as "rocker panels," are oftentimes sloped or curved inwardly from the upper portions of the sides of a vehicle in such a manner that they have been heretofore difficult, if not impossible to wash by means of rotary brushes in washing devices heretofore known in the art. The brushes 27 and 27a afford particularly effective means for effectively washing such portions of the body of a vehicle. As may be seen, the brushes 27 and 27a are disposed at a particularly good angle for engaging such rocker panels, and are so constituted and arranged relative to the brushes 21 and 21a, respectively, that each tends to maintain the other in operative engagement with a vehicle moving therepast.

If desired, the operator may set the selector switch 75 in such position that the movable contacts 84 and 85 are disposed in engagement with the stationary contacts 78 and 79 and the stationary contacts 80 anl 81, respectively. With the switch 75 set in this position, the solenoid-actuated valve 46 is energized at all times, to thereby urge the brushes 21, 27, 21a, and 27a toward inwardmost position, as shown in FIG. 2. Under these conditions, the circuit for the solenoid-actuated valve 46 extends from one side 90 of the power source through the conductors 89 and 88, the contacts 78, 84, and 79 of the switch 75, the conductors 87 and 74, the winding of the solenoid-actuated valve 46, and the conductors 58 and 63, back to the other side 64 of the power source. However, the conductor 68 to which the solenoid-actuated valve 26, 26a, 33, and 33a, and the motors 35, 34, 35a, and 34a are connected is still connected to the switches 95 and 97, so that when either of these last-mentioned switches is open these last-mentioned electrical units are deenergized. However, when the switch 97 is closed, and the vehicle-actuated switch 95 is also closed, an electrical circuit extends from the side 90 of the power source through the conductor 89, the switch 97, the conductor 96, the switch 95, the conductors 94 and 92, the contacts 81, 85, and 80 of the switch 75, the conductors 86 annd 73, and from the conductor 73 through the windings of the solenoid actuated valves 26, 26a, 33, and 33a and through the motors 35, 34, 35a, and 34a, as previously described, to the conductor 63 and thus back to the other side 64 of the power source.

Figure 4:
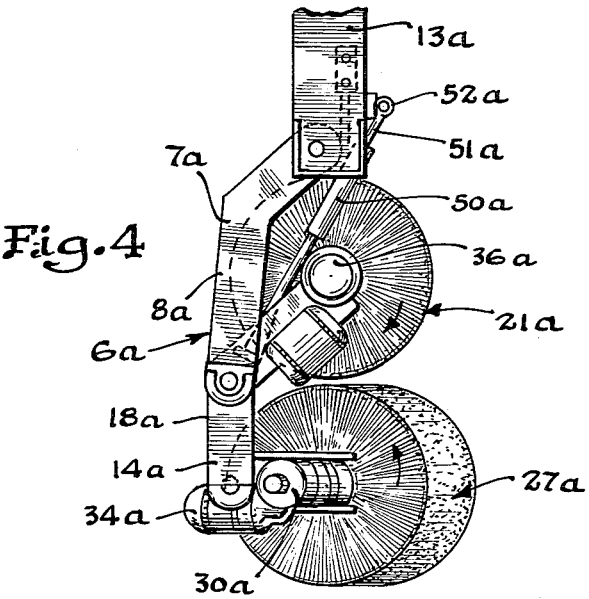
FIG. 4 is a fragmentary top plan view of a portion of the apparatus shown in FIG. 2, with certain parts shown in different operative position.

When the brushes 21 and 27 and the brushes 21a and 27a are disposed in fully outward actuated position, they are preferably disposed in the position shown in FIG. 4 for the brushes 21a and 27a, wherein the arm 18a of the mounting bracket 14a is disposed in substantially the same vertical plane as the arms 8a and 9a on the mounting bracket 7a, with the peripheral portions of the brushes 21a and 27a projecting inwardly beyond the adjacent side portion 13a of the housing 2.

The brushes 21 and 27, and the brushes 21a and 27a are so disposed on the housing 2, and relative to each other, that when a vehicle passes therebetween during a washing operation, they engage the adjacent side surfaces thereof with a substantial force so that the rotation of these brushes relative to the side surfaces of the vehicle affords an effective scrubbing action. It will be remembered that the pairs of brushes 21 and 27, 21a and 27a are yieldingly urged inwardly toward each other by pressure of the air on the pistons 28 and 28a, so that during movement of a vehicle along the path of travel of the vehicle through the washing device 1, the vehicle may force the brushes outwardly toward full outwardly disposed position, such as the position shown for the brushes 27 and 27a in FIG. 4. Thus, the side-washing apparatus 5 is adapted to effectively operate on vehicles of various widths.

From the foregoing, it will be seen that we have afforded a novel washing device for washing portions of vehicles, and the like.

Also, it will be seen that the present invention affords a novel washing apparatus which is particularly effective to wash the sides of a vehicle, or the like, having an inwardly inclined lower edge portion.

In addition, it will be seen that the present invention affords a novel washing device for the sides of a vehicle, or the like, and which washing device may be used alone or together with apparatus for washing other portions of the vehicle.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A washing device for washing portions of a vehicle during movement of said vehicle along a predetermined path of travel and comprising
 (1) two pairs of brushes,
 (2) means for supporting said pairs of brushes on respective sides of said path of travel,
 (3) each of said pairs of brushes including
  (a) one brush rotatably mounted for rotation around a substantially vertical axis, and
  (b) another brush projecting below said one brush and rotatably mounted for rotation around an axis which projects upwardly and outwardly away from said path of travel at an acute angle to the vertical,
 (4) said two brushes in each said pairs being pivotally mounted on said supporting means for swinging movement as a unit toward and away from said path of travel,
 (5) means for yieldingly urging said pairs of brushes to pivot inwardly toward said path of travel,
 (6) means operatively connected to said brushes for rotating the latter, and
 (7) means for feeding liquid outwardly through said brushes during rotation thereof.
2. A washing device as defined in claim 1, and in which
 (1) includes actuating means for said urging means
  (a) disposed in position to be actuated by a vehicle passing along said path of travel, and
  (b) is only effective to urge said brushes toward said path of travel when actuated by said vehicle.
3. A washing device as defined in claim 1, and in which
 (1) said urging means is operable at all times during operation of said washing device to urge said brushes inwardly toward said path of travel.
4. A washing device for washing the sides of a vehicle during movement of said vehicle along a path of travel aligned with said sides, and wherein the lower edge portions of said sides of said vehicle slope downwardly and inwardly from the remainder thereof, said washing device comprising
 (1) two pairs of brushes,
 (2) means pivotally supporting said pairs of brushes on respective opposite sides of said path of travel for pivotal swinging movement inwardly toward and outwardly away from the longitudinal center of said path of travel between an outer position, wherein said brushes are disposed in the outer edge portions of said path of travel, and an inner position wherein said brushes are disposed closer to said longitudinal center of said path of travel,
 (3) one of said brushes of each of said pairs being disposed in position to engage the adjacent said lower edge portion of one side of such a vehicle during movement of said vehicle therepast along said path of travel, (4) the other of said brushes of each of said pairs being disposed in position to engage the adjacent said side of said vehicle above said lower edge portion thereof during movement of said vehicle therepast along said path of travel, (5) means for yieldingly urging said pairs of brushes toward said inner position, and (6) means for wetting the surfaces of said vehicle engaged by said brushes.

5. A washing device as defined in claim 4, and in which
(1) said supporting means includes
   (a) two brackets,
      (1') each of said brackets rotatably supporting a respective pair of said brushes, and
   (b) two other brackets,
      (1') each of said other brackets
         (a') being pivotable toward and away from said path of travel, and
         (b') operatively supporting a respective one of said first-mentioned brackets for pivotal movement therewith toward and away from said path of travel.

6. A washing device as defined in claim 5, and in which
(1) said urging means includes fluid-actuated members operatively connected to said other brackets for swinging said other brackets and thereby said first-mentioned brackets toward and away from said path of travel.

7. A washing device as defined in claim 5, and which includes
(1) yieldable means operatively connected to said first-mentioned brackets for yieldingly holding sad first-mentioned brackets against pivotal movement relative to said respective other brackets in all positions of the latter.

8. A washing device as defined in claim 5, and which includes
(1) dashpots pivotally mounted on said supporting means and operatively connected to said first-mentioned brackets for yieldingly holding said first-mentioned brackets against pivotal movement relative to said respective other brackets in all positions of the latter.

9. A washing device for washing the sides of a vehicle during movement along a path of travel aligned with said sides, and wherein the lower edge portions of said sides of said vehicle slope downwardly and inwardly from the remainder thereof, said washing device comprising
(1) two pairs of substantially cylindrical-shaped brushes,
(2) means pivotally supporting said pairs of brushes on respective opposite sides of said path of travel for pivotal swinging movement inwardly toward and outwardly away from the longitudinal center of said path of travel between an outer position, wherein said brushes are disposed in the outer edge portions of said path of travel, and an inner position, wherein said brushes are disposed closer to said longitudinal center of said path of travel,
(3) one of said brushes of each of said pairs being disposed in position wherein the longitudinal center line thereof is substantially vertical,
(4) the other of said brushes of each of said pairs projecting inwardly toward said center line of said path of travel further than said one brush of said respective pair and being disposed in position wherein the longitudinal center line thereof projects upwardly and outwardly away from said path of travel at an acute angle to the vertical, (5) means for urging said brushes inwardly toward said inner position into engagement with said vehicle along said path of travel,
(6) means operatively connected to said brushes for rotating the latter during movement of said vehicle therepast, and
(7) means operatively connected to said brushes for feeding liquid outwardly therethrough during movement of said vehicle therepast.

10. In a washing device for washing vehicles of the type wherein the vehicles are washed as they move along a predetermined path of travel through said device, the combination of
(1) supporting means disposed on respective opposite sides of said path of travel, and
(2) brush units pivotally mounted on said supporting means for pivotal movement toward and away from said path of travel,
(3) each of said brush units including
   (a) a substantially U-shaped mounting bracket having
      (1') a body portion rotatably mounted on said supporting means for rotation around a vertical axis, and
      (2') two substantially parallel arms projecting horizontally from said body portion,
   (b) another mounting bracket, said other mounting bracket including
      (1') a body portion disposed between and rotation around a vertical axis relative to said U-shaped bracket,
      (2') a pair of arms projecting horizontally outwardly from said last-mentioned body portion, and
      (3') another arm projecting horizontally outwardly from said last-mentioned body portion,
   (c) a substantially cylindrical-shaped brush rotatably mounted between sad last-mentioned pair of arms for rotation around a substantially vertical axis, and
   (d) another substantially cylindrical-shaped brush rotatably mounted on said other arm for rotation around an axis which projects upwardly and outwardly relative to said path of travel,
(4) said other brush projecting lower, and further inwardly toward the center of said path of travel, than said first-mentioned brush.

11. The combination as defined in claim 10 and in which
(1) said second-mentioned pair of arms and said other arm projecting from each other at an obtuse angle opening generally inwardly toward said path of travel.

12. The combination as defined in claim 10, and which includes
(1) pneumatically actuated means operatively connected to said first-mentoned body portions and said supporting means for swinging said U-shaped brackets toward and away from said path of travel, and
(2) dashpot means operatively connected to said second-mentioned body portions and said supporting means for yieldingly holding said other brackets from rotation relative to said U-shaped brackets in various positions of the latter.

References Cited in the file of this patent
UNITED STATES PATENTS

| | | |
|---|---|---|
| 695,255 | Wheeler | Mar. 11, 1902 |
| 2,257,255 | Yingling | Sept. 30, 1941 |